April 2, 1963  W. H. NEWELL  3,084,267

CONVERTER OF HEAT INTO ELECTRICAL ENERGY

Filed July 19, 1960

Inventor
WILLIAM H. NEWELL

By
Borst and Borst Attorneys

United States Patent Office 3,084,267
Patented Apr. 2, 1963

3,084,267
CONVERTER OF HEAT INTO ELECTRICAL ENERGY
William H. Newell, Mount Vernon, N.Y., assignor to Sperry Rand Corporation, Ford Instrument Company Division, Wilmington, Del., a corporation of Delaware
Filed July 19, 1960, Ser. No. 43,833
3 Claims. (Cl. 310—4)

This invention relates to an energy converter and particularly to a converter which is adapted to effect a conversion of heat energy to electrical energy.

According to the Nernst effect, a temperature gradient in a material with a magnetic field applied at right angles to it causes a potential gradient at right angles to both the temperature gradient and the magnetic field. This invention contemplates the provision of electromagnetic components arranged to effect heat to electric energy conversion in accordance with this effect. To this end a heat source is arranged as a core upon which a conductor in the form of a spiral plate is wound. The conductor is subjected to a magnetic field with the resultant that a potential gradient is effected which is a function of the magnitude of the temperature gradient and the applied magnetic field. A more detailed description of the component arrangement is described below, the description being taken in conjunction with the drawings, in which FIG. 1 is a diagrammatic illustration of one embodiment of the invention, and FIG. 2 is an enlarged detail of the spiral plate conductor.

Figure 1:
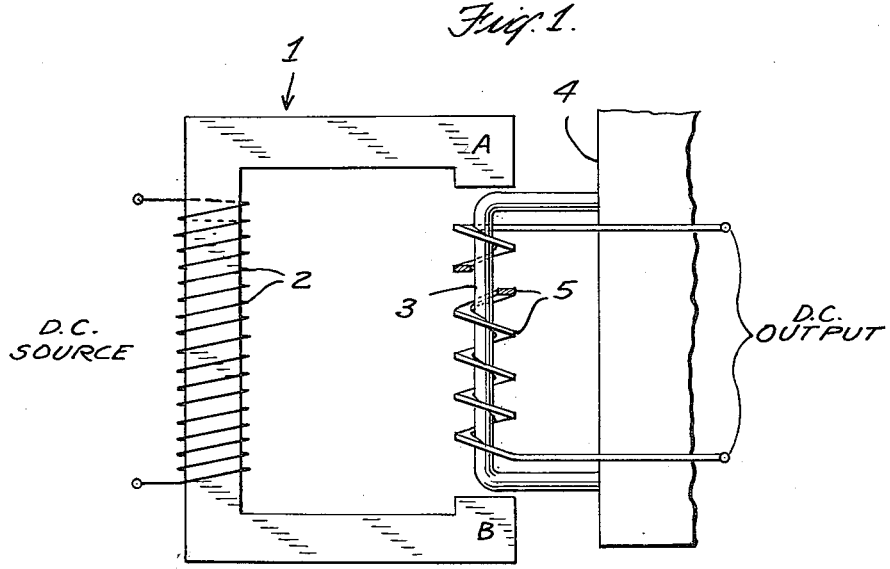
Figure 2:
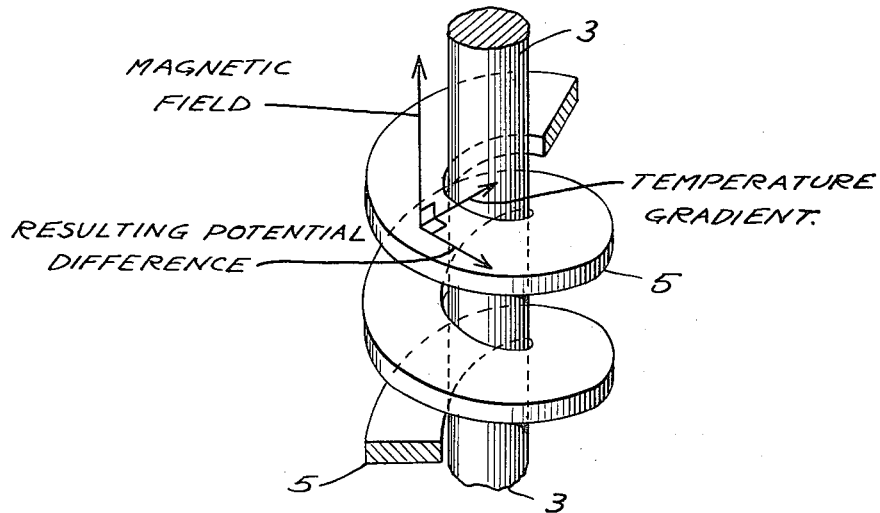

Referring to FIG. 1 of the drawing, there is provided an electromagnet 1 having a constant D.C. source applied to a coil 2 which is wound thereon. Between the pole pieces A and B of the electromagnet there is disposed a core 3 which is thermally connected to a heat source 4. A spiral plate conductor 5 is wound on the core 3 which extends nearly from pole piece to pole piece and is adapted to produce an electrical output in the presence of the field and a temperature gradient in the core.

The core supplies a source of high temperature and creates a temperature gradient within the spiral plate. The magnetic field applied axially with respect to the core is at right angles to the temperature gradient which is radial with respect to the core and causes a tangential potential gradient in the spiral plate conductor 5 which is at right angles to the magnetic field as well as the temperature gradient. The potential is produced in infinite increments in the conductor and is thus cumulative.

Obviously an A.C. transformer may be coupled to the magnet to produce an A.C. output if a secondary winding is also coupled to the output to remove the voltage created by magnetic induction. Various other modifications of the invention may be effected by persons skilled in the art without departing from the skill and scope of invention as defined in the appended claims.

What is claimed is:

1. A converter comprising a core, a spiral conductor wound about said core, a magnetic field source, and means for heating said core and thereby producing a temperature gradient in said conductor, said core being oriented in the direction of travel of the flux produced by said source, there being an output terminal on each end of said conductor.

2. A converter comprising, a magnet, a coil wound about said magnet, a source of current, said current being applied to said coil, a core, a heat source, said source of heat being applied to said core and a spiral plate wound about said core and placed within the field of said magnet there being an output terminal on each end of said plate whereby a current output is effected across said spiral plate whenever a heat source and a magnetic field are present to produce a potential gradient.

3. A converter comprising a core, a spiral conductor disposed proximate said core and codirectionally with a portion thereof, means for heating said core and thereby producing a temperature gradient in said conductor, a magnet field source, said core being oriented in the direction of travel of the flux produced by said source, there being an output terminal on each end of said conductor.

References Cited in the file of this patent
UNITED STATES PATENTS
375,408     Acheson _____ Dec. 27, 1887